United States Patent
Mores

[19]
[11] Patent Number: 6,148,409
[45] Date of Patent: Nov. 14, 2000

[54] DATA TRANSMISSION SYSTEM

[75] Inventor: Robert Mores, Hamburg, Germany

[73] Assignee: U.S. Philips Corporation, New York, N.Y.

[21] Appl. No.: 09/011,868

[22] PCT Filed: Jun. 17, 1997

[86] PCT No.: PCT/IB97/00709

§ 371 Date: May 18, 1998

§ 102(e) Date: May 18, 1998

[87] PCT Pub. No.: WO97/49033

PCT Pub. Date: Dec. 24, 1997

[30] Foreign Application Priority Data

Jun. 17, 1996 [DE] Germany ............................ 196 24 140

[51] Int. Cl.[7] ................................................. G06F 11/14
[52] U.S. Cl. ............................... 713/330; 714/1; 702/116
[58] Field of Search ............................... 714/1; 713/330; 702/116; 361/191; 340/870.12

[56] References Cited

U.S. PATENT DOCUMENTS

| | | | |
|---|---|---|---|
| 4,654,821 | 3/1987 | Lapp | 713/330 |
| 4,730,183 | 3/1988 | Crowe | 340/870.12 |
| 5,528,749 | 6/1996 | Landis et al. | 714/23 |
| 5,559,664 | 9/1996 | Dogul et al. | 361/191 |
| 5,757,670 | 5/1998 | Hoepken | 702/116 |

Primary Examiner—Thomas C. Lee
Assistant Examiner—Harold Kim
Attorney, Agent, or Firm—Leroy Eason

[57] ABSTRACT

In an electronic system for the transmission of data between a plurality of stations the control signals and functions of the basic elements of power supply, watchdog and signal converter in each station are linked to one another so as to ensure that the number of possible modes of operation, taken for all the elements, is reduced to a number necessary for the corresponding task and thereby guarantees a more reliable operation. Moreover, the linkage leads to an optimum default behavior of the station with regard to application-specific power-saving and safety requirements, even when, for example, the malfunction of the microcontroller of the station persists.

8 Claims, 4 Drawing Sheets

_(1)_

DATA TRANSMISSION SYSTEM

BACKGROUND OF THE INVENTION

The invention relates to an electronic system for transmitting data between a plurality of stations which are interconnected via a common bus.

In known systems of the type defined in the opening paragraph at least some of the stations have a microcontroller which controls the stations and is connected to the bus via an interface circuit constructed as a transmit/receive circuit, hereinafter also referred to as "signal converter", so as to transmit and receive information via this bus. The systems often also include a timing circuit, hereinafter referred to as "watchdog", which circuit supplies a signal to the microcontroller when it has not received a signal from the microcontroller for a time longer than a given duration. These elements, or at least some of them, are powered via a voltage regulator circuit when, for example in the case of automotive use, the available voltage is higher than the operating voltage of the elements. Under given conditions the microcontroller can set all the elements of the stations to a power-saving mode of operation, for example to spare a battery forming the power source, or the station can be restored to a normal mode of operation by local events or by signals via the bus.

External disturbances or disturbances in individual elements may give rise to undesired operating conditions. It is customary that the microcontroller detects any undesired operating conditions and takes steps to reset the station to an operating condition which is useful for the application. The microcontroller is again monitored by the watchdog and is reset to a well-defined initial state by means of a reset signal in the event of a malfunction.

An important drawback is that a continuously malfunctioning microcontroller, which neither operates correctly in the initial state, can no longer set the other elements to a well-defined default operating condition and, under given circumstances, the entire system with a plurality of stations will fail. The same situation arises when, for example, only the power supply to the microcontroller fails. Apart from failure of the entire system, effects may arise which are unfavorable for the application.

A further drawback is that in such situations the microcontroller can no longer set the relevant station to a power-saving mode because the serial data or information transmitted for this purpose via the system can no longer be evaluated in the station itself.

SUMMARY OF THE INVENTION

It is an object of the invention to provide a system in which, even in the case of continuous malfunctioning of the relevant microcontroller, a station is autonomously set to a default operating condition which is useful for the application.

According to the invention this object is achieved by means of the characteristic features defined in claim 1.

The principle underlying the invention is that the microcontroller is operated with the highest possible degree of reliability and, if necessary, can thus set all the other elements to an appropriate default mode, and that in the case of failure of the microcontroller itself the remaining elements in a self-contained and automatic manner establish a default mode which is optimized for the application, i.e. specifically as regards the safety requirements of the application, the power-saving requirement and the adverse effect on the entire system. Of special importance in this respect is the fixed invariable logic linkage between signals and hence between functions of the individual elements, as is possible for example by monolithic integration of the elements. This principle can be implemented in an effective manner for concrete cases of use.

In one embodiment the watchdog and the second voltage regulator are linked to one another in such a manner that upon a first reset signal from the watchdog, for example as a result of a software error, the second voltage regulator initially remains in the state previously defined by the microcontroller and in the case of a repeated reset, for example owing to a continuous malfunction of the microcontroller, the second voltage regulator is turned off, so as to ensure that subsequently the application-specific elements of the station are not powered and, consequently, not operated in an uncontrolled manner. Alternatively, the second voltage regulator may already be turned off immediately upon the first reset.

In a further embodiment the watchdog links the two supply voltages and the signal converter to one another in such a manner that in the case of a continuous malfunction of the microcontroller, detected on the basis of repeated resets, the two power supplies and the signal converter are turned off when in an extended function the watchdog ascertains that no more serial data have been transmitted for a given time interval and the entire system is obviously in a power-saving mode, so that also in the case of the defective station the power saving requirement is met.

In a further embodiment the watchdog and the second voltage regulator are linked to one another in such a manner that the second voltage regulator cannot be activated by the microcontroller (trigger) until after at least one successive reset operation of the watchdog, so that the application-specific elements cannot be operated in an uncontrolled manner during the starting phase of the microcontroller and also in starting phases of the microcontroller which are prolonged as a result of faults.

In a further embodiment the watchdog and the one supply voltage are linked to one another in such a manner that in an extended function the one supply voltage can be activated cyclically from a power saving mode and can thus wake up the entire station, so as to guarantee some basic functions of the station and at the same time save power.

In a further embodiment the signal converter and the one supply voltage are linked to one another in such a manner that in its power-saving mode the signal converter is still capable of monitoring the activities as regards the transmission of serial data in the system and is capable of waking up its associated station by automatic activation of the one supply voltage in response to a wake-up request transmitted from another station.

In a further embodiment the watchdog, the two supply voltages and the signal converter are linked to one another in such a manner that in the case of changes of the modes of operation of the stations these are controlled, preferably by means of a control signal, in such a way that the specific modes of operation of the individual elements change only jointly and simultaneously, as a result of which undesired transient modes are precluded and the requirements imposed on the application as regards safety and power saving are met, which signal can take the form of a serial or parallel control signal defined by known safety procedures and applied to an integrated element comprising the individual basic elements.

In a further embodiment the watchdog, the signal converter and a separate circuit for the detection of local wake-up requests are linked to one another in such a manner that, depending on whether the station is in a standby mode or in a power-saving mode, the cyclic, the local and the transmitted wake-up conditions are converted into a notification of the microcontroller, for example by interrupts in the case of a correct progress of the program, a reset of the microcontroller to its initial state and, consequently, a restart of the program, in order to achieve that the station is woken up as rapidly as possible depending on the instantaneous operational state.

In a further embodiment the watchdog, the signal converter and an additional monitoring circuit are linked to one another in such a manner that after a restart of the program cycle in the microcontroller the cause and source of the reset can be determined, and the microcontroller can thus determine the history before the reset and can optimize the program cycle, for example by skipping a learning operation and can optimize the data management, for example by again using previously generated data, the detection of reset sources taking into consideration, for example:

an initial system start after a first connection to the input voltage, a reset of the watchdog during monitoring of the program cycle, a reset for the cyclic wake-up of the system from a standby mode or power-saving mode by means of an extended function of the watchdog, a reset by a wake-up request in response to a request transmitted to the station by the application, a reset based on undervoltage conditions imposed on a supply voltage and hence on the microcontroller power supply, a reset as a new start attempt from a default mode which has been sustained for given time, for example because of an excess temperature, a reset by way of default measure when the microcontroller has not responded to an interrupt.

In a further embodiment the watchdog, the signal converter and an additional monitoring circuit are linked to one another in such a manner that actions initiated by warning functions, error indications and reset sources of the individual elements, in view of the action to be taken in order to set the entire station to a default mode, can be divided in an application-oriented manner into a notification of the microcontroller, for example by interrupts in the case of a correct progress of the program, a reset of the microcontroller to its initial state and, consequently, a restart of the program, a permanent reset of the microcontroller, and an automatic and self-contained set-up of the station to the default mode which is most useful for the application by means of the remaining elements.

The linking of the various control signals and functions of the individual basic elements as well as the default mode can be programmed in an application-specific manner by means of non-volatile memories on an integrated circuit.

Advantages obtained by linking the functions and control signals of the individual basic elements are a self-contained reset behavior which is optimal for the application, even in the case of a continuous malfunction of the microcontroller, secure power saving as a result of an autonomous turn-off even in the case of a faulty microcontroller, a more reliable operation of the system as a result of the secure reduction of the number of possible operating conditions in a station, further optimized operational program flow as result of reset source detection, well-defined system starts as a result of microcontroller-independent monitoring of the supply voltages, better possibilities of realizing quiescent current concepts.

Embodiments of the invention will be described in more detail, by way of examples, with reference to the drawings.

DESCRIPTION OF THE PREFERRED EMBODIMENTS

By way of example an application in the field of automotive electronics is described.

In the present application a system of up to 30 stations forms a network, each of the individual stations performing different security-related tasks, while the entire system should be optimized with respect to its power consumption so as to ensure that the battery of the on-board power supply is not drained excessively even in the case of comparatively long parking periods.

The secure operation is achieved by the reliable operation of the station and by its well-defined default behavior in the case of faults. For this purpose, each station employs an integrated element whose basic elements include a watchdog, two supply voltages and a signal converter.

As a first measure the control signals of the individual elements on the integrated circuit are linked to one another so as to allow only the seven operating conditions of a complete station which are required for the application, three of the seven operating conditions being modes of operation for the application:

normal operation (NB), standby operation (BB)

power-saving operation (SB), and the four start or default conditions, the cold start (KS), the warm start (WS), power-on default operation (VR), power-off default operation (UR).

As required by the application, the stations change over between normal operation and power-saving operation or standby operation, the change-over to normal operation being faster and the power saving being smaller in the standby mode than in the power-saving mode.

The reduction of the possible operating conditions is achieved in that the individual elements can be set only jointly to another operating condition by means of a single serial code word from the microcontroller to the integrated circuit.

The linkage enables the optimum default behavior for the application to be determined and a self-contained default behavior to be established even in the case of a continuously malfunctioning microcontroller.

Figure 1:
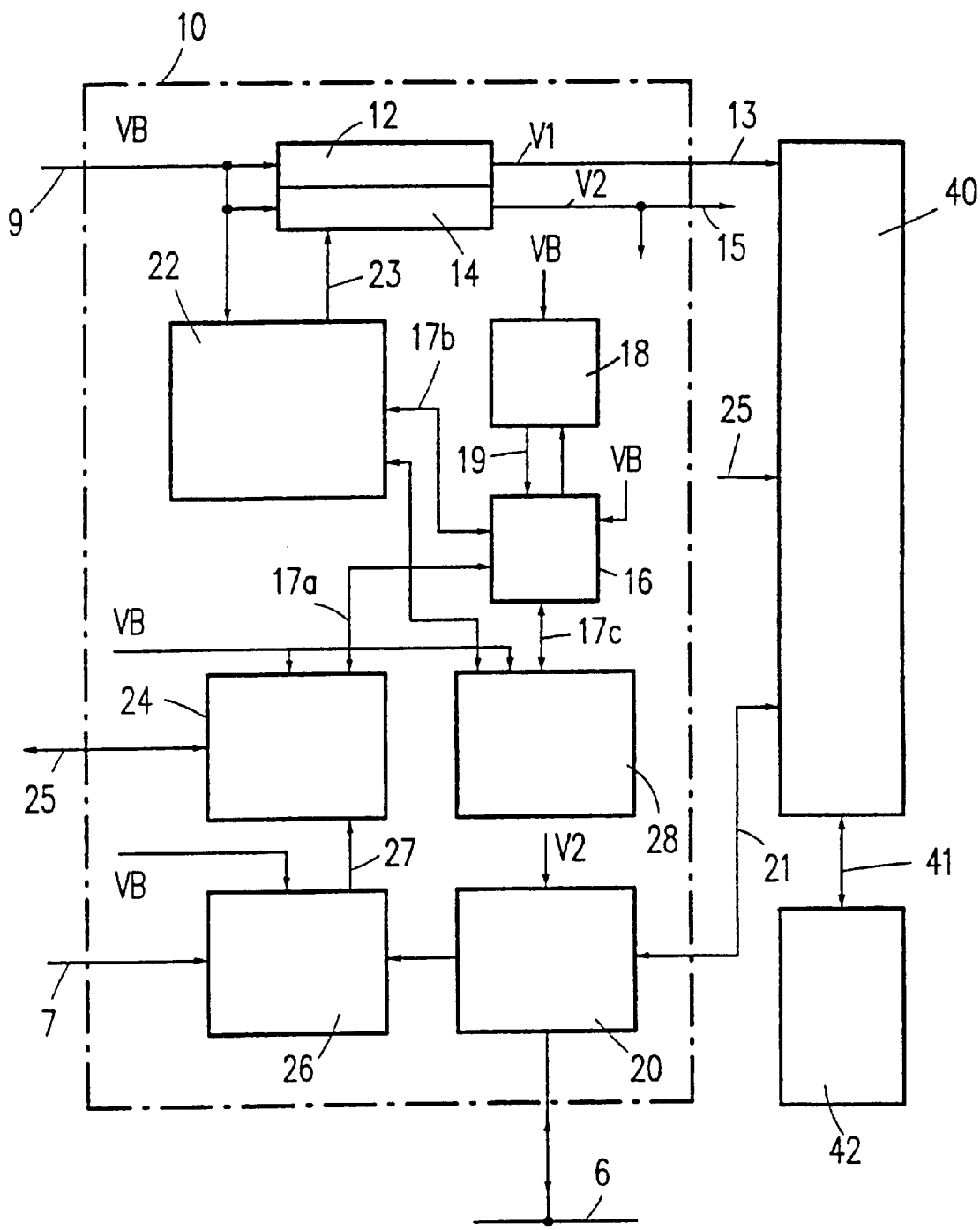
FIG. 1 shows a block diagram of a station in accordance with the invention.

FIG. 1 is a block diagram of a station in accordance with the invention. This station includes an integrated circuit 10 comprising some elements to be described hereinafter, and a microcontroller 40 connected to the integrated circuit 10 and also constructed as an integrated circuit in the customary manner. Via a connection 41 the microcontroller 40 controls peripheral circuits 42, which depend on the application and which may include, for example, switches for loads of comparatively high power. The integrated circuit 10 is further connected to a bus 6, to which further stations are connected, and has an input 7 via which so-called wake-up requests are applied, which issue for example from manually operated switches or from sensors. Via a terminal 9 the integrated circuit 10 receives an operating voltage which is higher than that required for the power supply of the microcontroller 40, the peripheral circuit 42 and given elements of the integrated circuit 10.

The supply voltage VB is applied to two voltage regulators 12 and 14 to derive the lower supply voltage for the relevant circuits. The voltage regulator 12 generates a voltage V1, which is only applied to the microcontroller 40 via a line 13. The voltage regulator 14 generates a voltage V2, which is applied to a transmit-receive circuit 20 within he integrated circuit 10 and also to the peripheral circuit 42. The voltage regulators 12 and 14 can be turned off individually or jointly by a monitoring circuit 22 via the line 23.

The integrated circuit 10 further includes an oscillator 18, which controls a watchdog timing circuit 16. The watchdog can alternatively be arranged outside the integrated circuit 10, preferably in the microcontroller. Moreover, there has been provided an interface circuit 28, which receives control words from the microcontroller 40 or which specifically transmits status words. A reset control circuit 24 generates a reset signal or an interrupt signal for the microcontroller 40 on the line 25 or it receives from this microcontroller a restart signal, which restarts the monitoring period. A circuit 26 converts the wake-up signals received via the input 7 or from the transmit-receive circuit 20 into control signals for the control circuit 24.

The watchdog 16 is connected to the interface circuit 28 via the connection 17c to enable it to be set to given monitoring periods by control words from the microcontroller 40 and to enable the settings of the monitoring periods and, if applicable, any further conditions to be reported to the microcontroller. Furthermore, the watchdog circuit 16 is connected to the control circuit 24 via a connection 17a in order to transmit to this circuit reset signals or interrupt signals for the microcontroller 40 or in order to receive a restart signal from the microcontroller. Moreover, the watchdog circuit 16 is connected to the monitoring circuit 22 via a connection 17b in order to turn on or turn off the voltage regulators 12 and 14 via this monitoring circuit. In addition, the interface circuit 28 is connected to the monitoring circuit 22 so as to allow the voltage regulators 12 and 14 to be also turned off by control signals from the microcontroller 40.

The monitoring circuit 22 monitors the non-regulated input voltage and can thus detect whether the voltage has been doubled by "jump-starting" and application-related elements should be protected by disabling them. Moreover, the monitoring circuit detects the loss of the input voltage by means of the attendant sudden voltage drop, as a result of which the station still can store any volatile data and terminate the program in a sensible manner, a local energy buffer providing the power supply to the station for the last-mentioned operations before a final loss of the supply voltage. Furthermore, the monitoring circuit can detect a temporary drop in the input voltage as a result of overloading, for example when the engine is started, so that the station can turn off application-related loads in order to spare the battery.

The transmit-receive circuit 20 is connected to the microcontroller 40 via a connection 21 to supply the data received from the bus to the microcontroller or to receive the data transmitted by the latter.

The elements 16, 18, 22, 24 and 26 are essentially powered with the supply voltage VB, so that they are constantly active, even when the voltage regulators 12 and 14 are inoperative.

Figure 2:
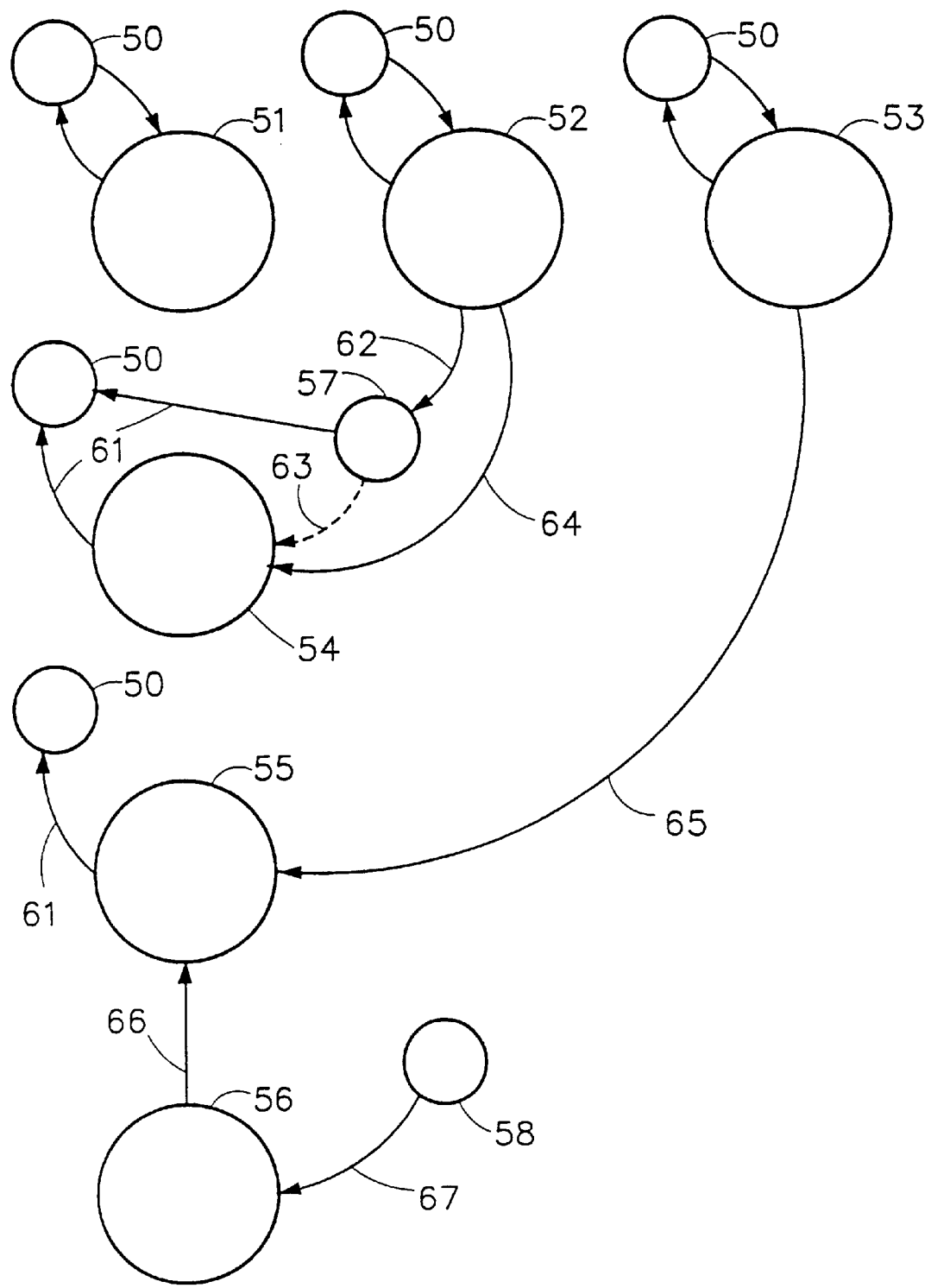
FIGS. 2 3 and 4 are diagrams of state transitions.
Figure 3:
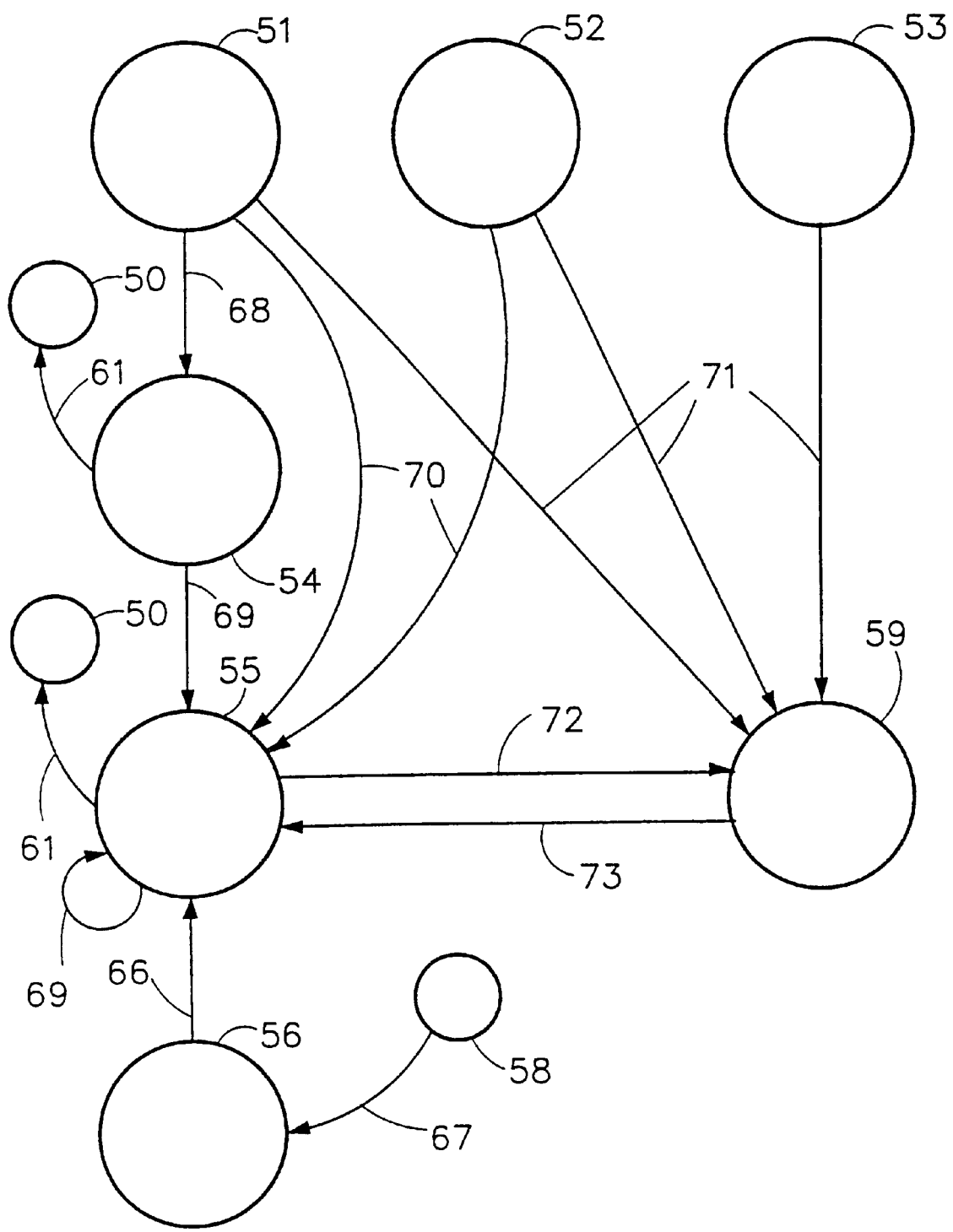
Figure 4:
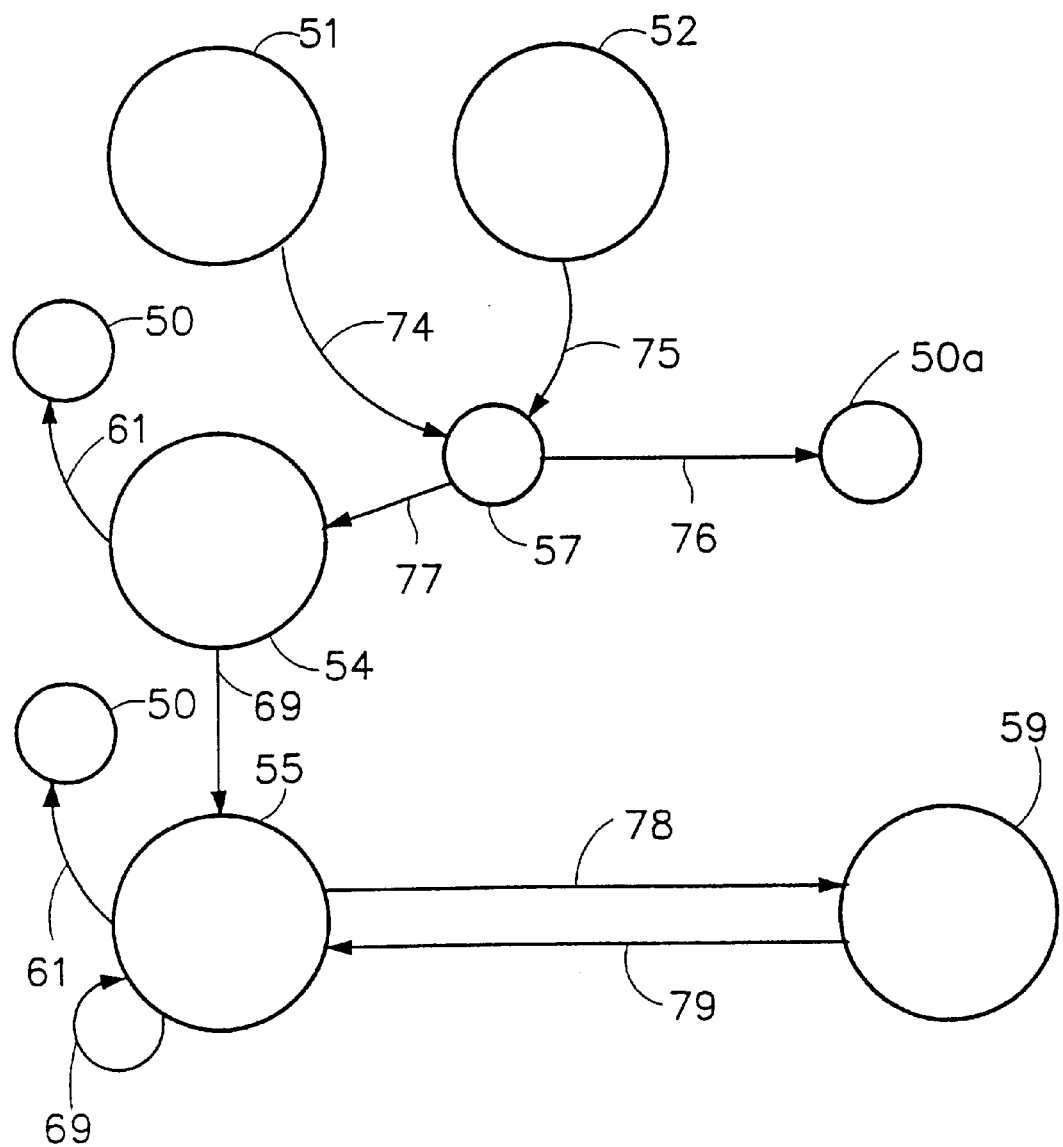

FIGS. 2 to 4 graphically represent the operating conditions, where V1 represents the supply voltage for the microcontroller and V2 the supply voltage for the periphery and the signal converter and can be turned on and turned off. In normal operation the signal converter (SF) can transmit and receive serial data and in its power-saving mode (standby) it can only receive wake-up requests. Moreover, the signal converter can present a high impedance with respect to the lines to other stations in the system. In normal operation the watchdog (WD) has short periods for software monitoring as well as long and very long periods for the cyclic wake-up of the station from the standby mode and the power-saving mode, respectively. Moreover, the watchdog monitors the microcontroller after a reset (starting).

In this embodiment the various self-monitoring functions, warning functions and reset sources are divided into warning functions by means of interrupts when the microcontroller is not impaired in its program execution, for example jump start, voltage drop of the input voltage, early voltage loss, fault in signal converter, excess-temperature message as an early warning for an overtemperature cut-out, undervoltage for the other supply voltage, and default functions through reset when the microcontroller operation is impaired temporarily, for example in the case of temporary errors in the program execution, unanswered warning interrupt, unanswered wake-up interrupt, unanswered warm start, for example as wake-up, and autonomous microcontroller-independent permanent default operation in the case of microcontroller failure, for example in the case of persistent incorrect supply voltage at the microcontroller, unanswered cold or warm start of the microcontroller, overtemperature cut-out (protection against self-destruction of the integrated components).

In FIG. 2 the state numbers have the following meanings 50 mode change; only in NB, BB and SB by the microcontroller, 51 NB with V1, V2 on, SF normal, WD normal/off, 52 BB with V1 on, V2 on/off, SF standby, WD long/off, 53 SB with V1 off, V2 off, SF standby, WD very long/off, 54 WS with V1 on, V2 as before, SF as before, WD starting for reset pulses, 55 KS with V1 on, V2 off, SF=standby, WD starting, reset=V1 controlled (for Wdh. –>pulse), 56 UR with V1 off, V2 off, SF in high-impedance state, WD off,

57 INT, 58 any state, and the transition numbers denote

61 SCW,

62 INT masked wake-up requirement (if wake-up requests are neither INT masked nor RESET masked: default to RESET), 63 no SCW in WD period, 64 RESET masked wake-up request, RESET masked cyclic start by WD, 65 all local wake-up requests, transmitted wake-up request, cyclic wake-up by WD, 66 initial power supply of integrated components, 67 loss of supply voltage to integrated components.

In FIG. 3 the following state number in addition has the meaning

59 VR with V1 off, V2 off, SF standby, WD off, and the transition numbers denote 68 WD overflow (normal), 69 WD overflow (starting), 70 undervoltage V1, 71 overtemperature cut-out, 72 no wake-up request for a long time or overtemperature cut-out, 73 wake-up request (if previous state "KS") or overtemperature protection no longer necessary.

In FIG. 4 the following state number in addition has the meaning 50a change of mode, the microcontroller itself being capable of selecting an arbitrary default behavior, and the transitions denote 74 masked interrupts: errors in SF, V2 undervoltage, jump start, overtemperature warning, interrupt at terminal 30, 75 masked interrupts, 76 SCW (also cancels interrupt), 77 no SCW within WD period 78 no wake-up request for a long time, 79 wake-up request.

In all the figures the references have the following means
SCW serial code word for selection of the mode of operation and triggering of the WD, NB normal operation, BB standby operation, SB power-saving operation, WS warm start without change of V1, KS cold start, possibly with V1 running up, UR non-powered default operation, SF signal converter for serial data, WD watchdog for program monitoring, V1 supply voltage of the microcontroller, V2 supply voltage of the signal converter and the application-related components, INT interrupt.

What is claimed is:

1. A station for a system for the transmission of data between a plurality of stations which are connected to one another via a common bus, the station including at least the following elements a microcontroller, a transmit/receive circuit coupled to said microcontroller and connected to the bus, a timing circuit (watchdog) for the generation of reset signals for the microcontroller, and a first voltage regulator, which station can be in a normal mode of operation or in at least one further mode of operation, preferably in a standby mode, wherein under given conditions the watchdog supplies reset signals or interrupt signals to the microcontroller, in that there has been provided at least a second voltage regulator, the first voltage regulator exclusively powering the microcontroller and both voltage regulators being capable of being disabled, in that the number of possible modes of operation is limited to given modes of operation by linking of the control signals of the individual elements, and in that by linking of the control signals of the individual elements sub-functions of the station, particularly default functions, can be set autonomously without participation of the microcontroller.

2. A station as claimed in claim 1, wherein the watchdog and the second voltage regulator are linked to one another in such a manner that the second voltage regulator is disabled by a given number of successive reset signals from the watchdog.

3. A station as claimed in claim 1, wherein the watchdog, the two voltage regulators and the transmit/receive circuit are linked to one another in such a manner that in the absence of the transmission of data via the bus the two voltage regulators are disabled by a given number of reset signals.

4. A station as claimed in claim 1, in which the second voltage regulator is disabled in the standby mode, wherein the second voltage regulator is turned on only by a trigger signal from the microcontroller to the watchdog.

5. A station as claimed in claim 1, which is in a power-saving mode, wherein instead of generating reset signals the watchdog periodically generates brief turn-on signals for both voltage regulators.

6. A station as claimed in claim 1, which is in a power-saving mode, wherein the transmit/receive circuit autonomously turns on both voltage regulators upon reception of a wake-up request via the bus.

7. A station as claimed in claim 1, wherein (underline) the two supply voltages and the transmit/receive circuit are linked to one another in such a manner that common control signals for the individual modes of operation switch all the elements to another mode of operation only jointly and simultaneously.

8. A station as claimed in claim 1, the station including wake-up means for the generation of local wake-up requests, wherein (underlined) the watchdog, the transmit/receive circuit and the wake-up means are linked to one another in such a manner that the watchdog transmits either an interrupt signal or a reset signal to the microcontroller depending on whether a cyclic, a local or a transmitted wake-up request appears and depending on the mode of operation of the station.

* * * * *